Feb. 26, 1952     H. A. GUION ET AL     2,587,147
DOSE TIME INDICATOR
Filed May 8, 1950
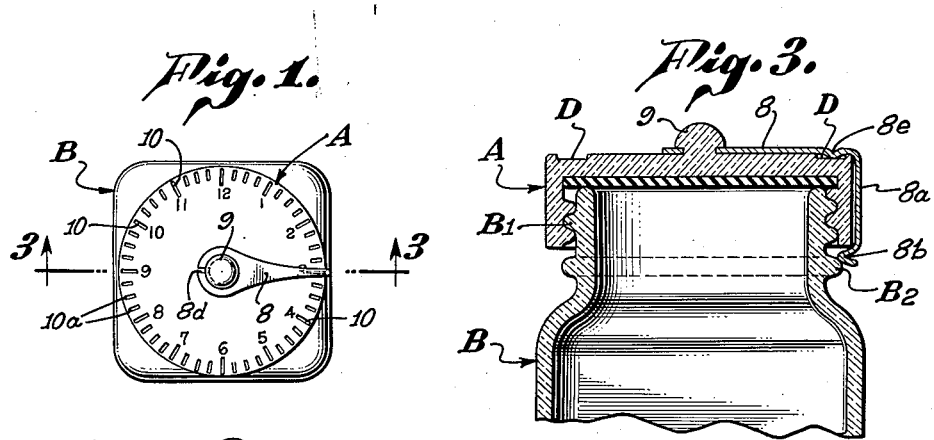
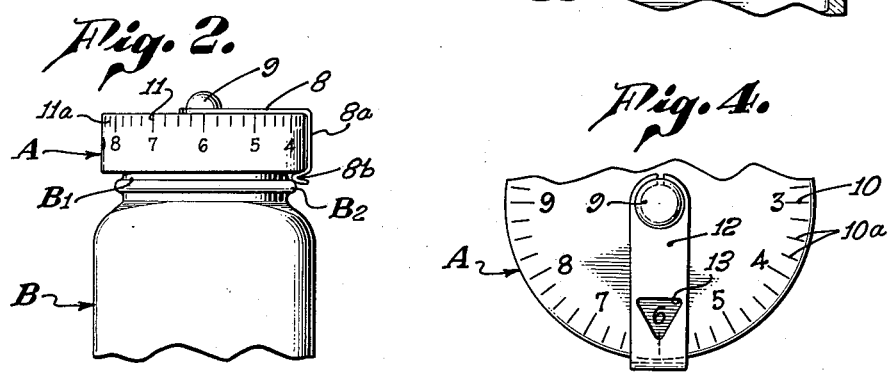
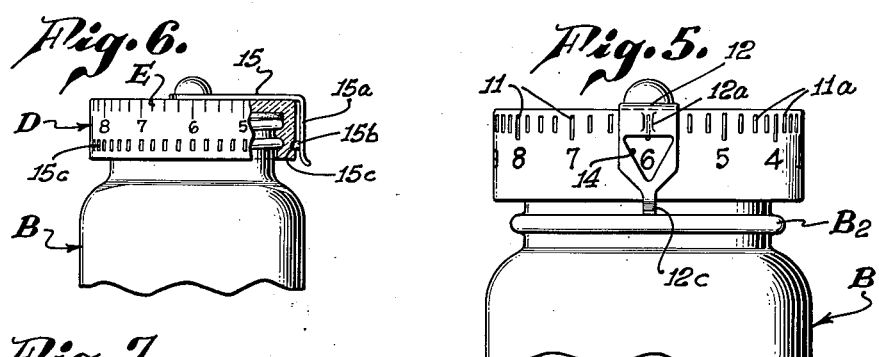
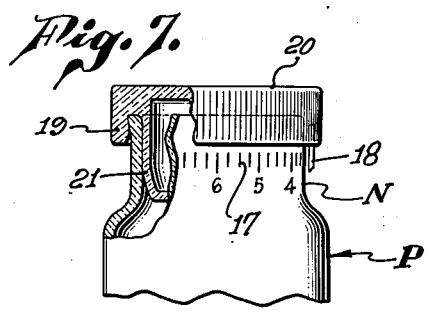
HENRY A. GUION,
EVELYN ARNOLD,
          INVENTORS.
BY
Paul A. Weilein
          ATTORNEY.

Patented Feb. 26, 1952

2,587,147

UNITED STATES PATENT OFFICE 2,587,147

DOSE TIME INDICATOR

Henry A. Guion and Evelyn Arnold,
Los Angeles, Calif.

Application May 8, 1950, Serial No. 160,642

8 Claims. (Cl. 116—121)

This invention relates to a device for indicating the time that doses of medicine, tonic, and the like, in pill, capsule and other forms, should be taken according to a prescribed schedule, and more particularly pertains to an indicator of this character which is conspicuously positioned on the bottle containing the doses.

One of the objects of this invention is the provision of a simply constructed, compact, and reliable dose time indicator which is arranged on the closure for the bottle in a particularly novel and advantageous manner such that, the indicator will not interfere with the normal handling of the closure and will assure that due note will be taken of the dose taking time indicated thereby.

It is another object of this invention to provide an indicator such as described which may be read with ease when viewing the bottle from the side thereof and as well as when looking down thereon.

Another object of this invention is to provide an indicator such as described wherein the indicating pointer is effectively held against unintentional or accidental movement from position in which it is set to indicate a specific time for taking a dose.

Further, it is an object of this invention to provide an indicator wherein the bottle closure effects the locking of the pointer in set position.

Another object hereof is to provide a dose time indicator where the operation of closing the bottle causes the closure to clamp the pointer against the bottle and lock it in set position.

It is an additional object to provide an indicating device such as described which is designed so that the operation of turning or screwing the closure in place or of removing the closure does not cause the pointer to be moved out of set position.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a top plan view of a dose time indicator embodying the present invention;

Figure 2 is a side elevation of the indicator;

Figure 3 is an enlarged sectional view taken on the line 3—3 of Figure 1, showing how the pointer is locked in indicating position;

Figure 4 is a fragmentary top plan view of a modified form of this invention;

Figure 5 is a side elevation of the indicator shown on Figure 4;

Figure 6 is a side elevation, partly in section, of another modified form of this invention; and Figure 7 is a fragmentary side elevation partly in section of another modified form of this invention.

Referring to Figures 1, 2 and 3, it will be seen that one form of indicator embodying this invention, is provided on a flanged closure cap A of a bottle B, the cap in this instance being of the internally screw threaded type for cooperation with the externally screw threaded neck $B_1$ of the bottle.

In this form of the invention a pointer 8 is pivoted at one end on a projection 9 at the center of the cap A, so as to be movable to point to clock or watch dial indicia printed or otherwise applied to the top surface of the cap. As here shown, this indicia consists of numbered hour graduations 10 between which appear quarter hour markings 10a, but may be otherwise graduated to indicate time as desired. Thus, the top of the cap A with the pointer 8 and indicia 10 thereon has the appearance of the face of a watch or clock.

As a means providing for reading the indicator when viewed from the side, as when the bottle is near or above eye level, as on a shelf or in a medicine cabinet, numbered hour and quarter hour graduations 11 and 11a, corresponding to the graduations 10 and 10a are provided on the outer side of the cap flange, or in other words, on the side surface of the cap A as shown in Figure 2, and the pointer 8 has an extension 8a which overlies the side surface of the cap, to point to the graduations 11 and 11a.

Preferably, the numbered graduations 10 and 10a are formed as indentations as best shown at D on Figure 3, so as to frictionally hold the pointer 8 in set position, as will be hereinafter more fully described.

As a means for locking the angular pointer 8 so that it will not be accidentally moved out of a set position in handling the cap or the bottle with the cap thereon, the lower end of the extension 8a is formed with a right angular extending V-shaped portion 8b which extends beneath the lower edge of the flange of the cap A so that it will abut the annular bead $B_2$ exteriorly of the bottle neck when the cap is tightened, thereby clamping the portion 8b between the cap and said bead. With bottles which have no bead or flange corresponding to the bead B2 here shown, the portion 8b may be engaged with the innermost screw thread on the neck or made longer to contact the body of the bottle, wherewith to clamp and hold the pointer in place.

The pointer 8 is preferably made of resilient metal or other suitable resilient material and is split as at 8d at the pivoted end thereof to facilitate the pivotal connection thereof with the pivot member 9 on the cap 1 in assembling the indicator, it being noted that the member 9 is enlarged at its outer end to hold the pointer in pivoted connection with the cap. This form of pivotal connection makes it unnecessary to pierce the cap, thereby assuring an effective sealing action of the cap.

The pointer 8 is pivoted on the cap so as to have tensioned contact therewith and is formed with a dimple or small projection 8e which is adapted to engage the depressions formed by the graduations 10 and 10a as shown in Figure 3, to aid in properly setting the pointer and to hold the pointer against accidental movement out of set position. As the pointer is turned about its axis the projection 8e will snap into the depressed graduations 10 and 10a, thereby assuring proper alignment of the pointer with the desired time indicating graduations. This detent means is advantageous as it enables the setting of the pointer to indicate the desired or next dose-taking time while the cap is removed from the bottle, with the assurance that in handling the cap, the pointer will be held against accidental movement out of set position. Moreover, the restraint against movement of the pointer afforded by the detent element 8e engaging the depressed graduations 10 and 10a assures that the operation of screwing the closure in place and removing it will not move the pointer out of set position.

It is to be understood that while, as here shown, the indicator may advantageously embody the portion 8b to be clamped on the bottle by the cap as well as the indented graduations and the projection 8 as separate means for holding the pointer against unintentional movement, either of such means may be omitted and within the scope and purview of this invention.

As shown in Figures 4 and 5, a modified form of this invention embodies the same construction as is shown in Figures 1, 2 and 3, as to the cap A and time graduations 10 and 10a, 11 and 11a, and manner of pivoting the pointer to the cap, the differences in construction being that the pointer 12 is provided with openings or windows 13 and 14 affording full view of the graduations, and that the time graduations 11 and 11a are formed as depressions to receive the projection 12a on the angularly extended portion 12b of the pointer. In this form the free end portion 12c of the pointer may be of the formation as shown in Figures 1, 2 and 3, for locking the pointer on tightening the cap.

Another modified form of the invention as shown in Figure 6 comprises a cap D with time indicia E on its side and top and a resilient pointer 15 pivoted on the top in the same manner as shown in Figures 1, 2 and 3. This pointer has its downward extension 15a provided with a small knob or projection 15b adapted to engage a series of depressions 15c formed in the flange of the cap opposite and beneath the time indicia characters E so as to releasably hold the pointer in set positions. Thus, it is seen that the projection 15b will snap into the depressions 15c and releasably locking the pointer in set position. The free end of the pointer is turned outward as at 15d so that the extension 15 may be flexed outwardly with the fingers to disengage the projection 15b from the depressions 15c.

Another modification of this invention as shown in Figure 7, provides the dose time indicating graduations 17 on the neck N of the bottle P while the pointer 18 is fixed to the flange 19 of a cap 20. A stopper portion 21 is carried by the cap for insertion into the bottle like a bottle cork or stopper. The frictional engagement of the portion 21 with the neck of the bottle assures that the pointer 18 will remain in position in which it has been set to point to the selected time graduations 17.

We claim:

1. A dose time indicator for medicine bottles, comprising: a member having a top surface and a side surface each provided with characters for indicating time for taking doses, and a pointer on said closure movable relative thereto having portions overlying said top and side surface thereof to point to said characters thereon.

2. A dose time indicator comprising: a closure having a side surface on which appear characters for indicating time for taking doses and a pointer pivoted on said closure and having a portion overlying said side surface for pointing to said characters.

3. A dose time indicator, comprising: a member having angularly related surfaces each provided with characters for indicating the time for taking doses, and an angular pointer mounted on said closure for movement relative thereto to point alike to the characters on said surfaces.

4. A dose time indicator, comprising: a bottle closure having a surface on which appear time characters for indicating the time for taking doses, a pointer pivotally mounted on said closure for selectively pointing to said characters, and a portion on said pointer disposed to be clamped by the closure against a bottle to hold the pointer against movement when the closure is applied to the bottle.

5. A dose time indicator, comprising: a closure having angularly related surfaces, and characters on said surfaces for indicating the time for taking doses, a resilient pointer mounted on said closure for movement relative thereto into positions to point to said characters, and coacting detent means on said closure and pointer for restraining movement of said pointer.

6. A dose time indicator comprising: a bottle closure having dose time indicating characters thereon, a pointer mounted on the closure for movement relative thereto to point to selected characters, and a portion on said pointer disposed to engage the bottle and hold the pointer against movement when the closure is applied to the bottle.

7. A dose time indicator comprising: a bottle closure having dose time indicating characters thereon, a pointer mounted on the closure for movement relative thereto to point to selected characters, detent means embodied in the closure and said pointer to restrain movement of the pointer out of set position, and a portion on the pointer arranged to be clamped between the closure and the bottle to hold the pointer against movement.

8. A dose time indicator, comprising: a bottle closure member, having dose time indicating characters thereon, a pointer member mounted on the closure member for movement relative thereto to selectively point to said characters, one of said members having indentations thereon, and a projection on the other of said members for engagement with said depressions to restrain movement of said pointer, and an extension of said pointer disposed to be clamped by the closure against the bottle to which the closure is applied.

HENRY A. GUION.
EVELYN ARNOLD.

REFERENCES CITED

The following references are of record in the file of this patent:

UNITED STATES PATENTS

| Number | Name | Date |
|---|---|---|
| 623,171 | Mowry | Apr. 18, 1899 |
| 650,617 | Salomon | May 29, 1900 |
| 784,194 | Victor | Mar. 7, 1905 |
| 1,317,660 | Carlson | Sept. 30, 1919 |
| 2,215,466 | Ehrlich | Sept. 24, 1940 |
| 2,450,949 | Gattuccio et al. | Oct. 12, 1948 |

FOREIGN PATENTS

| Number | Country | Date |
|---|---|---|
| 17,336 | Great Britain | Sept. 17, 1895 |
| 27,011 | Great Britain | Dec. 12, 1908 |
| 68,109 | Germany | Sept. 17, 1892 |